United States Patent [19]

Freier, Jr. et al.

[11] Patent Number: 5,085,044
[45] Date of Patent: Feb. 4, 1992

[54] TWO-BLADE MOWER DECK WITH INFINITE HEIGHT ADJUSTMENT

[75] Inventors: Edward Freier, Jr., Port Washington; Gary A. Hays, Cedarburg; John F. Jacque; Kenneth H. Klas, both of Port Washington, all of Wis.

[73] Assignee: Simplicity Manufacturing, Inc., Port Washington, Wis.

[21] Appl. No.: 586,605

[22] Filed: Sep. 24, 1990

[51] Int. Cl.$^5$ .................... A01D 34/66; A01D 34/72
[52] U.S. Cl. .................... 56/13.5; 56/16.9; 56/17.1; 56/295
[58] Field of Search ............ 56/295, 255, 13.5, 13.6, 56/16.9, 6, 17.1, 17.2, 17.5, 16.7

[56] References Cited

U.S. PATENT DOCUMENTS

| | | | |
|---|---|---|---|
| 2,779,147 | 1/1957 | Musgrave | 56/13.6 |
| 2,960,811 | 11/1960 | Roesel | 56/295 |
| 4,099,366 | 7/1978 | Peterson | 56/13.6 |
| 4,232,505 | 11/1980 | Walto | 56/13.6 X |
| 4,346,547 | 8/1982 | Allison | 56/13.6 |
| 4,958,484 | 9/1990 | Busboom | 56/13.5 X |

FOREIGN PATENT DOCUMENTS 2140265 11/1984 United Kingdom ............... 56/295

Primary Examiner—Stephen J. Novosad
Attorney, Agent, or Firm—Reinhart, Boerner, Van Deuren, Norris & Rieselbach

[57] ABSTRACT

A two blade mower deck for lawn and garden tractors having a continuous height adjustment feature. The mower deck includes a primary cutting blade and a smaller diameter secondary cutting blade. The secondary cutting blade is positioned to the side and slightly to the rear of the primary blade so that the cutting swaths of the blades overlap when the tractor moves forward. A continuous roller across the rear end of the mower deck follows the ground contour to prevent scalping or uneven cutting. The vertical position of the roller relative to the mower deck housing can be continuously adjusted by a crank handle to permit continuous adjustment of the cutting height.

12 Claims, 2 Drawing Sheets

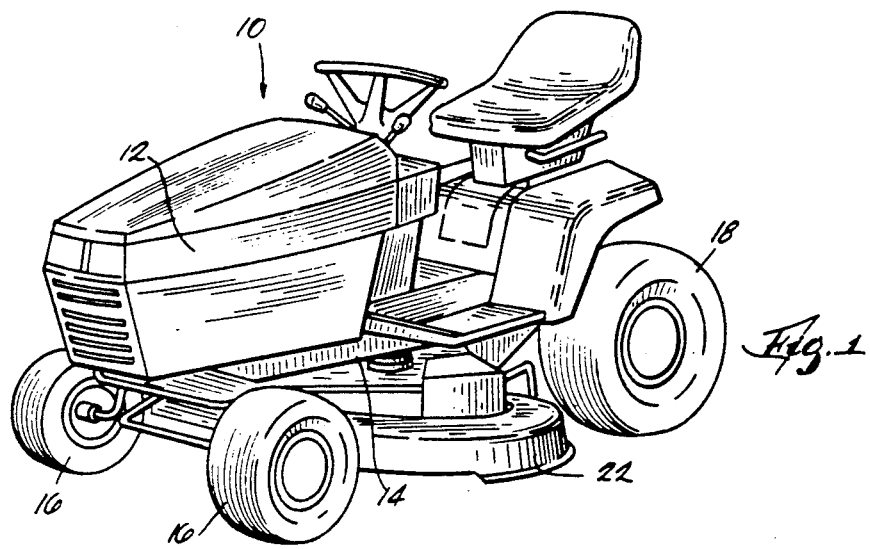
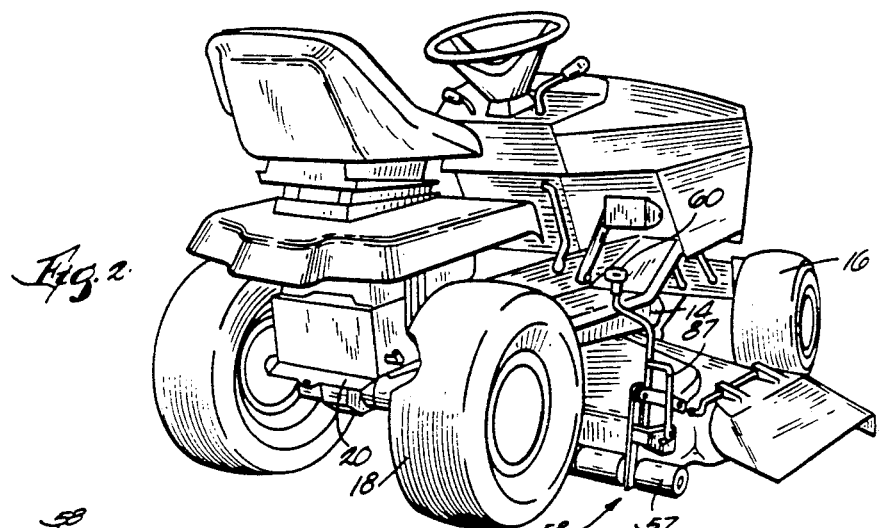
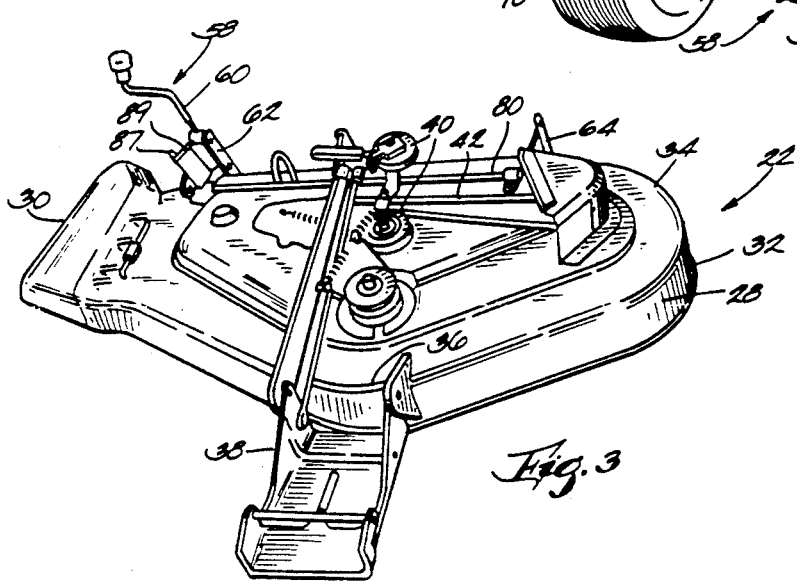

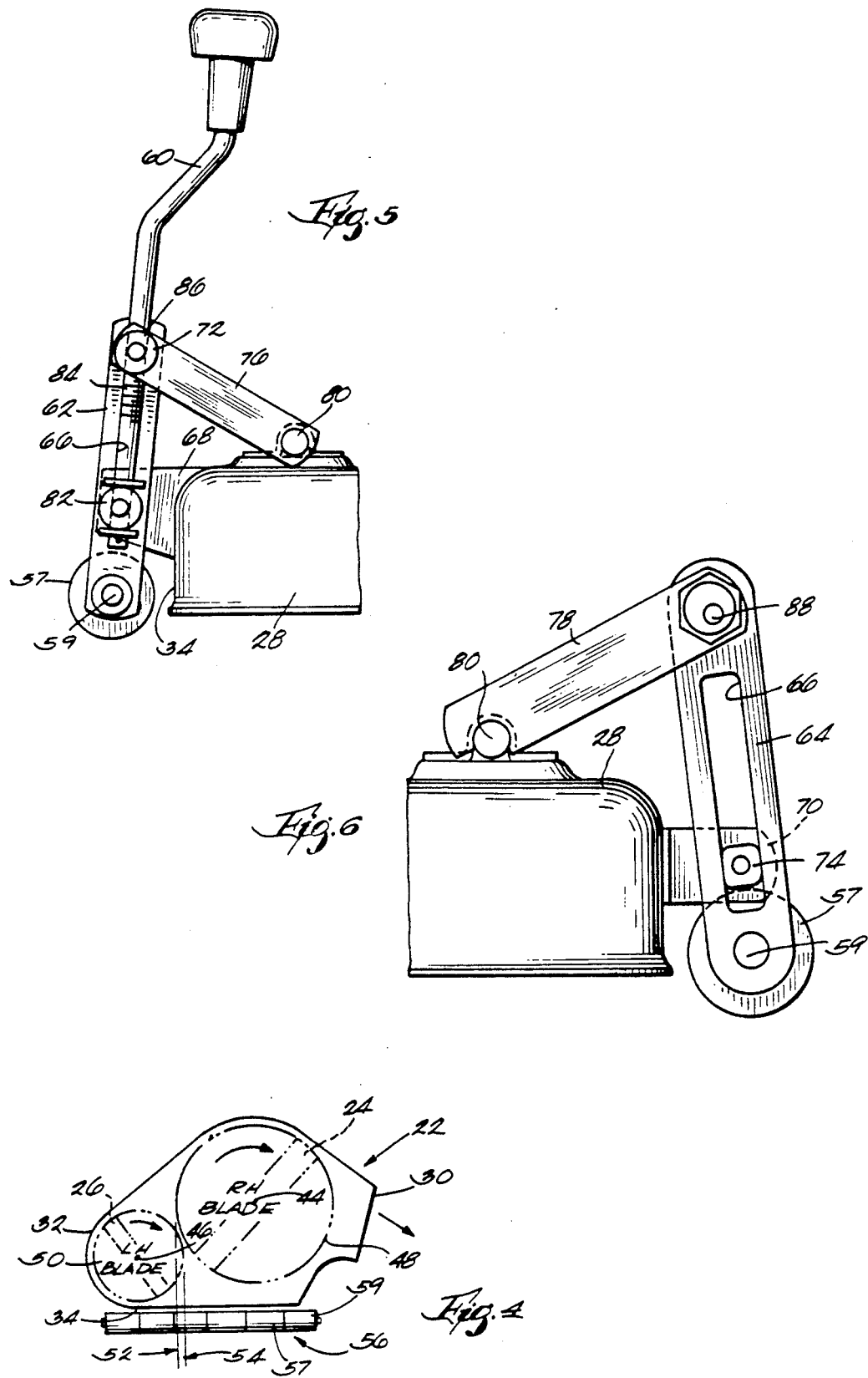

TWO-BLADE MOWER DECK WITH INFINITE HEIGHT ADJUSTMENT

BACKGROUND OF THE INVENTION

This invention relates generally to lawn and garden tractors and, more particularly, to mower decks for lawn and garden tractors.

To reduce the time needed to mow a lawn, mower decks for lawn and garden tractors should be relatively wide from side to side. However, to reduce vehicle length, such decks should be relatively narrow from front to back. To satisfy both these requirements, various known mower decks include two blades in side-by-side relation.

When two side-by-side blades are used, some provision should be made to ensure that the swaths cut by each blade overlap. This avoids leaving a strip of uncut grass between the blades. Various overlap systems have been developed for two bladed mower decks.

In one common arrangement, two equal size blades are offset slightly front to back. By placing one blade slightly ahead of the other along the direction of travel, each blade cuts a swath that overlaps, slightly, the swath cut by the other blade. Such a "tangent overlap" system is effective when the tractor is moving straight ahead, but can break down during turns when the relative direction of movement is along a path extending between the blades. In addition, placing one blade ahead of the other increases the front to back dimension of the mower deck.

Another overlap system calls for orienting the blades so that the rotational paths or circles described by the blade tips physically overlap. In such a "blade overlap" system, the blades must be timed or synchronized to avoid their hitting each other. This calls for relatively complicated and expensive gearing and can be dangerous if the blades somehow become unsynchronized.

Still another overlap system calls for the addition of a third, smaller blade positioned behind and between the two main blades. The main blades are spaced sufficiently apart to prevent their hitting, and the small third blade cuts the grass missed by the two main blades. Although effective, the addition of another blade increases complexity, expense and complicates routine maintenance.

To further increase the utility of a mower deck, some provision should be made for adjusting cutter height. In the past, cutter height was adjusted by setting the mower deck support wheels or rollers to one of several discreet height settings. To permit a wide range of adjustment, several of the discreet settings were required. This increased the cost and complexity of the mower deck. In addition, because of the discreet height adjustment steps, it was impossible in some circumstances to achieve the optimum cutting height.

In view of the foregoing, it is a general object of the present invention to provide a new and improved two-blade mower deck.

It is a further object of the present invention to provide a new and improved mower deck that provides reliable and effective mowing path overlap in a variety of cutting conditions.

It is a still further object of the present invention to provide a new and improved mower deck that is simple, reliable and economical in manufacture.

It is a still further object of the present invention to provide a new and improved mower deck that allows infinitely variable adjustment of the cutting height.

SUMMARY OF THE INVENTION

The invention provides a two blade mower deck for lawn and garden tractors comprising a primary cutting blade and a secondary cutting blade of smaller diameter than the primary blade. The primary blade rotates about a first center point, and the secondary blade rotates about a second center point disposed laterally from the first center point relative to the direction of forward travel of the tractor. The center points are located so that each of the tangents to the circles described by the two blades along the forward direction of travel extends through the described circle of the other blade.

In one embodiment, the center point of the secondary blade is to the side and rear of the center point of the primary blade.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a front perspective view of a lawn and garden tractor having a mower deck embodying various features of the invention.

FIG. 2 is a rear perspective view of the lawn and garden tractor shown in FIG. 1.

FIG. 3 is a perspective view of a mower deck constructed in accordance with various aspects of the invention.

FIG. 4 is a diagramatic representation of the mower deck showing the configuration and arrangement of the cutting blades.

FIG. 5 is a fragmentary side view of the right rear corner of the mower deck useful in understanding the construction and operation of the continous height adjustment mechanism.

FIG. 6 is a fragmentary side view of the left rear corner of the mower deck useful in understanding the construction and operation of a side-to-side leveling feature.

DESCRIPTION OF THE PREFERRED EMBODIMENT

Referring to the drawings, a lawn and garden tractor 10 embodying various features of the invention is illustrated in FIGS. 1 and 2. The tractor 10 comprises a prime mover, such as a gasoline engine 12, mounted on a frame 14. The frame 14 supports a pair of front wheels 16 and a pair of rear wheels 18. A drive train 20 couples the engine 12 to the rear wheels 18 to propel the tractor over the ground. A mower deck 22 constructed in accordance with various features of the invention is suspended below the frame 14 between the front and rear wheels.

Referring further to FIGS. 3 and 4, the mower deck 22 includes a pair of elongate mower blades 24. 26 mounted for rotation within an overlying rigid housing 28. The housing includes, at one side, a discharge opening 30 for discharging clippings. The other side 32 is closed. A substantially straight rear wall or back edge 34 extends between the sides 30, 32 and is oriented perpendicularly to the direction of travel when the mower deck 22 is in place on the tractor 10. The forward edge of the mower deck housing projects forwardly thereby forming a point 36, and a hitch assembly 3 for detachably mounting the mower deck 22 to the tractor 10 is attached adjacent the point 36. A suitable hitch assembly is shown, for example, in the concurrently filed co-pending application of, Ser. No. 07/586,607, entitled "Hitch System For Lawn and Garden Tractors," the specification of which is incorporated by reference herein. An arrangement of pulleys 40 and belts 42 couples power from the engine to the rotating blades 24, 26.

As best seen in FIG. 4, the blades 24, 26 are of dissimilar diameter. The larger or primary blade 24 is positioned adjacent the discharge end 30 of the mower deck housing 28, and the smaller or secondary blade 26 is positioned adjacent the closed end 32. Each blade pivots around a center of rotation 44, 46 and the tip of each rotating blade 24, 26 describes a circle or rotation 48, 50. To ensure full cutting across the entire width of the mower deck 22, the centers of rotation 44, 46 are located so that the cutting swath of each blade 24, 26 overlaps that of the other when the tractor 10 moves forward. To this end, the centers 44, 46 are located so that a tangent 52, 54 to each of the cutting circles 48, 50 in the direction of forward tractor movement overlaps the tangent of the other blade. In the illustrated embodiment, the smaller or secondary blade 26 is positioned to the side and to the rear of the larger or primary blade 24.

The arrangement of two dissimilar size blades 24, 26 in this manner provides many advantages. The smaller secondary blade 26 serve as a "feeder" of clippings to the primary blade 24 but does not tend to overpower the primary blade 24 as can occur when blades of equal size are used. The larger or primary blade 24, in turn, provides substantial power for discharging clippings. The combination of blades therefore results in a mower deck 22 that provides improved discharge dispersal of the clippings. The improved throwing capability of the mower deck 22 permits the use of a greater selection of bagging equipment options.

A further advantage of the mower deck 22 is that the rear 34 edge of the mower deck housing 28 is straight and extends substantially perpendicularly to the line of movement of the tractor 10. This permits the use of a full width roller bar 56 for supporting the rear end 34 of the mower deck 22. The full width roller bar 56, in turn, follows the exact contour of the ground over which the tractor 10 is travelling. This improves the uniformity of the final cut and avoids "scalping" or the creation of bald spots that can occur, for example, when a mower deck, supported only at its corners, passes over a small raised zone or hump in the ground. Preferably, the roller bar 56 comprises a plurality of cylindrical rollers 57 mounted on an elongate axle rod 59.

In accordance with another aspect of the invention, the mower deck 22 further includes a continuous cutting height adjustment mechanism 58. This mechanism 58 includes an upwardly extending crank handle 60 that terminates adjacent the operator's right hand. By rotating the handle 60 in one direction, the cutting height is increased. Rotating the handle 60 in the opposite direction decreases the cutting height. The cutting height varies continuously over its range, and the handle 60 can be left in any position to obtain the optimum cutting height for the particular conditions encountered.

Referring to FIGS. 2, 3, 5 and 6, the continuous cutting height adjustment mechanism includes, in addition to the rotatable crank handle, a first upwardly extending bar 62 that engages and supports one end of the roller axle rod 59. A similar or second bar 64 adjacent the opposite side of the mower deck 22, supports the other end of the axle rod 59. Each of the bars 62, 64 includes a central, longitudinally extending slot 66, and each of the bars 62, 64 is mounted for sliding, substantially vertical movement relative to the mower deck housing 28. In the illustrated embodiment, the mower deck 22 further includes a pair of spaced pivot brackets 68, 70 extending rearwardly from the mower deck housing 28. A slide member 72, 74 is received in the slots 64, 66 to permit sliding movement of each bar 62, 64 relative to the adjacent pivot bracket 68, 70.

As further illustrated, the upper end of each bar 62, 64 is coupled through an elongate cross shaft arm 76, 78 to a cross shaft 80 extending across the top of the mower deck housing 28 adjacent, and spaced inwardly from, the rear end 34 thereof. As best seen in FIG. 5, the lower end of the crank rod is rotatably supported in a nonthreaded trunnion 82 that is fixed relative to the adjacent pivot bracket 68. The portion 84 of the crank handle 60 adjacent the upper end of the bar 62 is threaded and is received in a threaded trunnion 86 coupled to the end of the adjacent cross shaft arm 76. As the crank 60 rotates, the upper trunnion 86 moves relatively axially along the threaded portion 84 of the crank handle.

Rotation of the crank handle 60 in one direction draws the upper and lower trunnions 86, 82 toward each other. Rotation in the opposite direction drives the trunnions 86, 82 apart. As the trunions are drawn together, the bar 62 is forced downwardly thereby lowering the rollers 56 relative to the rear edge 34 of the mower deck housing 28. This has the effect of increasing the effective cutting height. Similarly, separating movement of the trunnions 82, 86 raises the rear rollers 56 relative to the rear edge 34 of the mower deck housing 28, thereby lowering the effective cutting height. The crank handle 60 can be rotated to any position within its range thereby providing a continous adjustment of the effective cutting height. Preferably, an indicator device, comprising an upright indicator rod 87 anchored to the mower deck housing 28, and a graduated indicator plate 89 attached to a movable part of the height adjustment mechanism 58, is included for providing a visual indication of the cutting height.

The mower deck 22 further includes a side-to-side leveling adjustment that enable the mower deck to provide a uniform cutting height across its width. The leveling adjustment is implemented at the side of the mower deck housing opposite the crank handle and is provided by means of an eccentric 88 that couples the upper end of the bar 64 to the outer end of the cross shaft arm 78. The eccentric 88, which can be locked in position by means of a threaded nut 90, can be rotated, after the nut 90 is loosened, to adjust the relative axial position of the bar 64 to the cross shaft arm 78. This motion causes the bar 64 to move up or down relative to the slide 74. This lowers or raises the adjacent corner of the mower deck housing 28 relative to the roller 56. By thus raising or lowering one corner of the mower deck housing 28, the mower deck 22 can be adjusted to provide a uniform and level cut across its entire width.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A two blade mower deck for lawn and garden tractors, comprising:
   a primary cutting blade rotating about a first center point; and
   a secondary cutting blade having a smaller diameter than said primary blade, said secondary blade rotating about a second center point disposed laterally from and to the rear of said first center point relative to the direction of forward travel of the tractor with each of the tangents to the circles described by said primary and secondary cutting blades along the forward direction of travel extending through the described circle of the other blade.

2. A mower deck as defined in claim 1 wherein said mower deck is powered by the lawn and garden tractor.

3. A lawn and garden tractor for cutting vegetation, comprising:
   a frame;
   an engine mounted on said frame;
   a drive train coupled to said engine and operable to move said lawn and garden tractor across the ground;
   a mower deck coupled to said frame having a mower deck housing and having only two blades for cutting the vegetation, said two blades coupled to said engine and including a primary cutting blade rotating about a first center point and a secondary cutting blade having a smaller diameter than said primary blade, said secondary blade rotating about a second center point disposed laterally from said first center point relative to the direction of forward travel of said tractor with the cutting path of said primary cutting blade overlapping the cutting path of said secondary cutting blade; and
   a full width roller bar coupled to said mower deck housing for following the contour of the ground.

4. A lawn and garden tractor as defined in claim 3 wherein said mower deck includes a housing having a closed end and a discharge end, and wherein said secondary cutting blade is disposed adjacent said closed end of said mower deck and said primary cutting blade is disposed adjacent said discharge end of said housing.

5. A lawn and garden tractor as defined in claim 3 wherein said lawn and garden tractor further includes means for continuously adjusting the effective cutting height of said mower deck.

6. A lawn and garden tractor as defined in claim 5 wherein said continuous height adjusting means comprises a rotatable crank handle and further comprises means for increasing the vertical spacing of said roller bar from said mower deck housing in response to rotation of said crank handle in one direction and for decreasing the vertical spacing of said roller bar from said mower deck housing in response to rotation of said crank handle in the opposite direction.

7. A lawn and garden tractor as defined in claim 6 wherein said continuous height adjusting means comprises a threaded portion on said crank handle, a threaded trunion engaging said threaded portion of said crank handle, and a non-threaded trunion axially fixed relative to said crank handle so that rotation of said crank handle in one direction draws said threaded and non-threaded trunions toward each other while rotation of said crank handle in the opposite direction drives said threaded and non-threaded trunions away from each other.

8. A lawn and garden tractor as defined in claim 7 wherein said continuous height adjusting means further comprises a pair of bars supporting said full width roller bar, a pair of pivot brackets mounted to said mower deck housing and engaging said bard with one of said pivot brackets supporting said non-threaded trunion, and a pair of cross shaft arms coupled to said threaded trunion and connected respectively to the ends of said bars so as to drive said bars downwardly in response to movement of said threaded and non-threaded trunions toward each other.

9. A two blade mower deck for a lawn and garden tractor, comprising:
   a mower deck housing;
   a primary cutting blade within said mower deck housing rotating about a first center point;
   a secondary cutting blade within said mower deck housing having a smaller diameter than said primary blade, said secondary blade rotating about a second center point disposed laterally from and to the rear of said first center point relative to the direction of forward travel of the tractor with each of the tangents to the circles described by said primary and secondary cutting blades along the forward direction of travel extending through the described circle of the other blade;
   a full width roller bar coupled to said mower deck housing for following the contour of the ground; and
   a continuous cutting height adjustment mechanism for continuously adjusting the effective cutting height of said mower deck.

10. A two blade mower deck as defined in claim 9 wherein said continuous cutting height adjustment mechanism comprises a rotatable crank handle and further comprises means for increasing the vertical spacing of said roller bar from said mower deck housing in response to rotation of said crank handle in one direction and for decreasing the vertical spacing of said roller bar from said mower deck housing in response to rotation of said crank handle in the opposite direction.

11. A two blade mower deck as defined in claim 10 wherein said continuous cutting height adjustment mechanism comprises a threaded portion on said crank handle, a threaded trunion engaging said threaded portion of said crank handle, and a non-threaded trunion axially fixed relative to said crank handle so that rotation of said crank handle in one direction draws said threaded and non-threaded trunions toward each other while rotation of said crank handle in the opposite direction drives said threaded and non-threaded trunions away from each other.

12. A two blade mower deck as defined in claim 11 wherein said continuous cutting height adjustment mechanism further comprises a pair of bars supporting said full width roller bar, a pair of pivot brackets mounted to said mower deck housing and engaging said bars with one of said pivot brackets supporting said non-threaded trunion, and a pair of cross shaft arms coupled to said threaded trunion and connected respectively to the ends of said bars so as to drive said bars downwardly in response to movement of said threaded and non-threaded trunions toward each other.

* * * * *